United States Patent [19]

Harvey

[11] Patent Number: 4,457,968
[45] Date of Patent: Jul. 3, 1984

[54] PROCESS FOR MANUFACTURE OF A POLY (PERFLUOROOLEFIN) BELT AND A BELT MADE THEREBY

[75] Inventor: Roger J. Harvey, Tallahassee, Fla.

[73] Assignee: Niagara Lockport Industries, Inc., Quincy, Fla.

[21] Appl. No.: 519,673

[22] Filed: Aug. 2, 1983

[51] Int. Cl.$^3$ .................. B32B 27/02; D03D 3/04; D03D 15/00; D21F 7/08
[52] U.S. Cl. .................................. 428/229; 26/28; 26/51; 139/383 A; 139/420 A; 139/425 A; 162/348; 162/DIG. 1; 428/298; 428/303; 428/422
[58] Field of Search ............... 26/28, 51; 139/383 A, 139/420 A, 425 A; 162/348, DIG. 1; 428/229, 298, 303, 422

[56] References Cited

U.S. PATENT DOCUMENTS

| | | | |
|---|---|---|---|
| 2,551,175 | 5/1951 | Smith | 139/420 A |
| 2,711,828 | 6/1955 | Webb et al. | 139/420 A |
| 3,019,821 | 2/1962 | White | 139/420 A |
| 3,068,053 | 12/1962 | Runton et al. | 139/420 A |
| 3,542,633 | 11/1970 | Goldsmith | 428/244 |
| 3,864,197 | 2/1975 | Shobert | 428/229 |
| 4,025,679 | 5/1977 | Denny | 428/229 |
| 4,161,195 | 7/1979 | Khan | 139/425 A |
| 4,168,298 | 9/1979 | Fitzgerald | 428/229 |
| 4,289,173 | 9/1981 | Miller | 139/420 A |

FOREIGN PATENT DOCUMENTS 1231737 4/1959 France ...................... 139/420 A

*Primary Examiner*—James C. Cannon

[57] ABSTRACT

A method for making a perfluoroolefin polymer filament belt is disclosed. The belt is substantially free of stretching under typical conditions of use including application of heat and force to the belt. This characteristic is produced by the process which includes the steps of weaving a belt and thermally fixing the woven belt by heating to the filaments to their white point while applying a force to the load bearing filaments.

14 Claims, No Drawings

PROCESS FOR MANUFACTURE OF A POLY (PERFLUOROOLEFIN) BELT AND A BELT MADE THEREBY

BACKGROUND OF THE INVENTION

The present invention relates to a substantially nonstretchable belt made of poly(perfluoro-olefin) filament.

The manufacture of products such as non-wovens, textiles, paper, building materials, filtration products and the like is accomplished by formation of a matt of component materials, which may be but are not necessarily fibers, and interbonding of the materials to produce the product. The matt is typically formed, conveyed or transferred on a belt and it is upon the belt that processing of the matt to the final product is accomplished. This may take the form of forming, drying, bonding, heating, pressing and other common processing steps.

The belt must be capable of supporting the matt, withstanding the conditions of the processing steps, causing substantially few impressions upon the matt surface and be long wearing. Belts used for this purpose can be made of woven wire such as bronze or stainless steel or can be woven from synthetic fibers and filaments such as polyester or bicomponent filaments; see for example U.S. Pat. No. 4,112,982; U.S. Pat. No. 4,086,941; U.S. Pat. No. 4,041,989 and U.S. Pat. No. 3,858,623. These belts exhibit durability characteristics, do not substantially stretch and can be made with a weave which permits passage of an adequate volume of air.

These known belts, however, have several disadvantages. Processing temperatures will be limited by the servicable temperature range of the yarns used to make the belts and this will adversely affect productivity and product parameters. The materials used in the matt making also are able to adhere to the belts, thus contaminating them. This requires that the production lines must be periodically shut down in order to clean the belts. Moreover, some products, such as paper and asphalt contaminate them in such a way that they can not be effectively cleaned. Such belts are also subject to chemical and thermal degradation in the process environment. Finally, they often are effective heat conductors since metal wire, filament or thermal conducting yarn is often used to weave them. Accordingly, they cause significant radiative energy loss during processing operations such as heating, drying and the like.

It is, therefore, an object of the invention to develop a belt which resists contamination by the matt it carries. Another object is the production of a long wearing, durable, substantially nonstretchable belt. A further object is the development of a belt which is not substantially thermally conductive and which can operate at higher service temperatures.

SUMMARY OF THE INVENTION

These and other objects are achieved by the present invention which is directed to a substantially nonstretchable belt of woven poly(perfluoroolefin) monofilament. Specifically, the belt is manufactured from a poly(perfluoroolefin) such as poly(perfluoroalkoxy) (i.e. Teflon PFA, a trademark of the Dupont Co.) through a process which renders the belt largely free of significant stretching under conditions used in the manufacture of the foregoing products.

The belt is a crimp intensive, multi-weave fabric of poly (perfluoroolefin) monofilament having about 15 to 200 load bearing filaments per inch and about 15 to 200 non-load bearing filaments per inch. The belt has a load bearing filament crimp of about 4% to 30% and a non-load bearing filament crimp of 1% to 30%, the total non-load and load crimp being from 5 to 35% wherein at least about 80% of the non-load bearing crimp is developed by crimp interchange from the load bearing filaments. The belt further has an air permeability of 50 to 2000 cu. ft. per min. per sq. ft. of fabric at a pressure drop of 0.5 inches of water. Finally, the belt fabric filaments are periodically and permanently bent in a high frequency, high amplitude sinusoidal-like configuration of sharp angles which causes mechanical interlocking of the filaments. These angles are primarily located within the filament junctions between the load and non-load filaments.

The inventive process for making the belt produces the nonstretchability characteristic exhibited by the belt even though the monofilament used to make the belt is highly stretchable. The process includes the steps of weaving poly (perfluoroolefin) monofilament of about 15 to 200 filaments per inch and a shute count of about 15 to 200 filaments per inch to produce a woven belt, and thermally fixing the belt by applying a force of 2 PLI to 50 PLI to it in the load bearing direction while simultaneously heating it to a temperature which is substantially close to the white point temperature of the monofilament. The thermal fixation is carried out for about 10 seconds to 30 minutes, preferably about 10 seconds to 5 minutes.

The white point temperature is the temperature at which the surface of a monofilament strand turns white and shows strain lines when it sharply curves over another object as a force is applied to the two ends of the filament and it is heated. This temperature will be within a range of 150° C. to 300° C. or 300° to 600° F.

Additional steps for the manufacture of the belt can also be used. These include finishing and surfacing the thermally fixed belt to substantially remove any surface irregularities.

DETAILED DESCRIPTION OF THE INVENTION

The poly(perfluoroolefin) belt of the present invention is prepared by a process which renders it substantially free of stretching or elongation even though the monofilament used to make the belt is highly stretchable. This allows use of the belt at temperatures approaching 600° F. Moreover, the belt possesses high release characteristics and extremely low chemical reactivity such that it remains substantially free of contamination during its use and does not substantially react chemically with products it carries.

It is understandable that a manufacturing belt made of a synthetic polymer of a perfluoroolefin such as perfluoroalkoxy would possess many advantages as a result of the perfluoroolefin characteristics. The high release character of the polymer as well as its lubricating, insulating qualities, chemical inertness and thermal stability would make the belt highly resistant toward contamination, and chemically unreactive. It also would permit facile removal of product matt, and would allow use of high operating temperatures.

Despite these features, however, polymers of perfluoroolefin, have a characteristic which, until development of the present invention, has prevented their use as the sole filament of a belt for non-woven material manufacture. Filaments of poly(perfluoroolefin) are highly stretchable. For example, granular resin poly perfluoroethylene exhibits an elongation of 100-200% at 23° C.; see Kirk-Othmer "Encyclopedia Of Chemical Technology" 3rd Ed., Vol 11, p. 9, Wiley, N.Y. (1980); and poly (perfluoroalkoxy) filament "Teflon ® PFA", a DuPont product, having an 8 mil or 25 mil caliper (DuPont Technical Bulletin, 1982) exhibits an elongation of 16% to 24% at 22° C. and at the breaking force point. Consequently, a belt made with a perfluoroolefin would be expected to undergo significant elongation (stretch) when used on an industrial matt manufacturing machine, such as a paper making machine. In fact this has been found to be true. A belt, which has been woven in typical fashion from polyperfluoroolefin filament, can not be used as a material manufacturing machine belt.

Indeed, a perfluoroolefin belt with nonstretchable properties has been a goal of many manufacturers. In general, however, these earlier attempts have used a polyperfluoroethylene monofilament as a replacement for wire or polyester filament. Such belts have proved to be failures primarily because of stretching. A polyperfluoroethylene belt woven in a manner similar to a wire belt, i.e. with an open mesh single layer weave, typically stretches so much after 10-20 minutes of use that it falls off the processing machine.

Surprisingly, it has been found that the process of the present invention can be used to manufacture a substantially non-stretchable poly(perfluoroolefin) belt from poly (perfluoroolefin) filament having a significant elongation factor. The belt prepared according to the invention shows little elongation under usual non-woven material manufacturing machine conditions including heat and tension.

Generally according to the invention, belt resistance toward stretching is obtained by incorporation of the following factors: (1) production of a crimp intensive weave; (2) employment of a weave having a load bearing system orientation; (3) use of thermal fixation for increased mechanical and thermal stability; and (4) employment of a weave construction having controlled crimp interchange. The two primary factors are the type of weave and thermal fixation.

The weave generally is a multi-layer type which is formed with a crimp intensive pattern. The crimp pattern and the resulting crimp knuckles are produced by the alternating over and under arrangement of overlapping load and non-load filaments. The crimp knuckles exhibit sharp angles rather than wave-like forms. The knuckle configuration in cross section is a high frequency, high amplitude sinusoidal pattern.

Thermal fixation transfers part of the crimp and a portion of the knuckles of the load bearing filaments of the belt to the non-load bearing filaments, locks the weave and in part provides thermal stabiity. Fixation causes the non-load bearing filaments to shrink in and take up the crimp being transferred from the load bearing filaments. It is believed that the softness of the filament and the force being applied to the crimp knuckle junctions between the load bearing and non-load bearing filaments combine to produce permanent partial deformation of the shape of the load bearing and non-load bearing filaments at portions of the crimp knuckle junctions. The filament portions within these areas become permanently bent with sharp curves and interlock to provide mechanical strength. The interlocking, however, is believed to be loose enough so that flexibility of the belt is maintained.

The processing steps for belt production according to the invention include: weaving the monofilament and thermal fixation of the belt. Supplemental, optional steps include surfacing and seaming.

Weaving the monofilament into a belt may follow any crimp intensive pattern designed to compensate for flattening of the resulting fabric and to build structural stability into the fabric. Generally, such weaves will be multi-layer patterns. The percentage of load bearing filaments in the weave pattern, i.e., those which will run in the machine direction when the belt is mounted on a manufacturing machine will be within a range of 55 to 90%.

A typical multiple weave used according to the invention will have from 15 to 200 filaments per inch in the load bearing direction and 5 to 200 filaments per inch in the non-load bearing direction. Generally, about 55% to 90% of the total number of filaments should be in the load bearing direction. During thermal fixation the load bearing filaments will be stretched at least about 5-15%.

Weaving can be accomplished on any loom designed to weave multiple harness fabrics and apply relatively low filament tension. Filaments should be tensioned to a force greater than zero but less than an amount which will cause excessive stretching.

As a result of weaving, the surface of the woven fabric will exhibit a regular pattern of load bearing and non-load bearing filament junctions. The load bearing filaments take an overall high frequency, high amplitude sinusoidal configuration as they pass first over then under non-loading bearing filaments. The curve of the filament as it rests at the surface of the fabric and then descends is a filament crossover. A non-load bearing filament will lie under the crest of a sinusoidally configured load bearing filament. The regular arrangement of crests are the imprinting pattern of the fabric. The crests are known in the art as "knuckles."

The knuckles constitute the fabric (belt) points on which the material carried by the fabric (belt) would rest. Consequently, release from these knuckles will determine the ease with which the material can be removed from the belt. The knuckles will also leave an imprint pattern upon the material as a result of the downward force of the material weight pushing the material into the valleys between the knuckles. Accordingly, it is also important that the interknuckle distances are small enough that the material does not take on a heavy imprint. Ideally, the weave pattern will produce interknuckle distances which are small enough to allow material support by the knuckle crests. This will also facilitate easy material release.

The tension applied to the filaments during weaving should be sufficient to allow the insertion of the shute material but low enough to prevent substantial stretching. Typically, the loom tension will be significantly lower than the filament yield point. This condition can be met through use of a tension from about 10 to 100 pounds per lineal inch and preferrably about 40. In contrast, normal tension used to weave a multilayer fabric would be considerably higher.

The crimp is another feature of the weave pattern which builds stability into the fabric belt. Crimp is the apparent shortening for a filament as a result of its sinusoidol configuration. A filament of, for example, 108 ft in length may have an apparent end to end length of 100 ft when woven. This would be a crimp of 8%. The extra 8 ft is taken up by the sinusoidol or curved path followed by the filament. For purposes of the invention, the weave pattern should produce a load bearing crimp of from about 5 to 35%.

Thermal fixing is the second step of the process which provides stability to the belt fabric. Thermal fixation causes crimp interchange and redistributes knuckles from the load bearing filaments to the non-load bearing filaments. The crimp and knuckle transfer is both thermal and mechanical. The belt is heated to its white point temperature which softens it and reduces its resistance toward bending. Simultaneously, a load or force is applied to the load bearing filaments while allowing the non-load bearing filaments to remain in a relaxed state. As a result, the filaments fix and become thermally and dimensionally stable. It is believed that the knuckle redistribution mechanically strengthens the fabric by interfilament mechanical locking around the knuckle junctions. The deformation of the filaments is believed to promote substantially the dimensional stability of the fabric. The load and heat requirements for the thermal fixation should be controlled with substantial care so that the physical characteristics of the filament are not substantially affected.

To achieve acceptable thermal fixation it is important to choose a weave pattern which will control the transfer of crimp from the load bearing to the non-load bearing filaments. The weave providing such control will be tight and create a restrictive filament path with respect to how much crimp will transfer. Generally, this weave will be arranged so that the load bearing filaments can never be pulled to a degree which would make them completely straight, i.e., having no crimp. Essentially, this requires that two adjacent non-load bearing filaments, around which a load bearing filament is woven, cooperate and work together to prevent the load bearing filament from becoming straight.

The conditions for thermal fixation have already been explained. Generally, applying a force to the load bearing filaments while heating the fabric to a temperature substantially close to the white point serves to provide thermal fixation. The force, temperature and time of fixation will usually be within the following ranges: a force of 2 PLI to 50 PLI, a temperature of 300° to 600° F., preferably 500° F. to 570° F. and a time period of 10 seconds to 15 minutes.

Practically negligible force is applied to the non-load bearing filaments during thermal fixation so that they will be free to curve sinusoidally in response to the straightening of the load bearing filaments. Consequently, crimp is also at least partially transferred from the load filaments to the non-load filaments. Generally the load bearing dimension will be expanded from 5 to 25% while the run dimension will contract from 5 to 35% with about 7 to 25% being preferred for both changes.

An effect of thermal fixation is contraction of the fabric weave pattern so that the filaments are closer together than can be achieved by the weaving process. Nevertheless, the air permeability of the thermally fixed weave will be high, within a range of from 50 to 2000 cubic feet per min. per sq. ft. of fabric at a pressure drop of 0.5 inches of water. This permeability is caused by vertical or meandering interfilament spaces passing through the weave from the top surface to the bottom. Accordingly, liquids and air will pass through the belt.

It is believed that thermal fixation causes interfilament permanent shape deformation of the filaments at the knuckle junctions. This interdirectional shape deformation does not involve autogeneous point bonding, however. Consequently, it does not affect the flexability of the fabric. It does, however, generate dimensional stability for the fabric by mechanically interlocking the filaments and helps prevent belt elongation during use.

Surfacing is an optional step which may be performed to correct imperfections in the belt fabric. Surfacing processes include such methods as sanding, compressing, calendaring and the like. For example, sanding corrects belt surface imperfections by making the surface flatter. It removes portions of the filaments at the crests of the knuckles and makes the surface more uniform. Since it lessens the diameter of the filaments at the crests, it can weaken the strength of the overall fabric. Consequently, it should only be used when the surface of the fabric varies greatly.

The following examples illustrate embodiments of the invention and are not meant as limiting. Other examples will be apparent to those skilled in the art.

EXAMPLES

Five examples of belt fabrics were prepared according to the following procedure. The filament, manufacturing and fabric parameters are given in Table 1.

Poly(perfluoroalkoxy) filament was woven on a commercial loom into a fabric of dimensions 160'×54" and employing a multilayer weave pattern. The loom tension employed was 23-45 pli warp and 150 gm shute tension.

The fabric was then heat set by applying a tensioning force of 5 PLI to 30 PLI to the load bearing filaments while heating the top of the fabric to a temperature of 500° to 600° F. for 1 to 2 minutes. This procedure transferred about 15% of the crimp to the run filaments and provided a percent change in dimension of 5% length and 25% width. The fabrics were then seamed to make them endless and finished by light sanding.

The endless belts were then fitted to a pilot machine and subjected to the conditions required for substrate formation. These include applying a force of 25 PLI to the belt by tensioning the belt rollers while passing it through a matting machine and a hot forced air dryer operating at a temperature of about 550° F. It was found that all belt examples released the product easily, did not become dirty and exhibited the dimensional stabiity to run to 3400 FPM. The belts could be operated continuously.

TABLE I

| COMPARISON OF FABRIC PROPERTIES | | | | | |
|---|---|---|---|---|---|
| | TEFLON 1 | TEFLON 2 | TEFLON 3 | TEFLON 4 | TEFLON 5 |
| CONSTRUCTION | | | | | |
| MD Yarn Size | .016" | .016" | .016" | .016" | .016" |
| XMD Yarn Size | .020" | .020" | .020" | .020" | .020" |
| EPI Finished | 68 | 66 | 68 | 74 | 74 |
| PPI Finished | 34 | 28 | 28 | 34 | 34 |
| Weave | #2 | #2 | #311 | #311 | #311 |

TABLE I-continued
COMPARISON OF FABRIC PROPERTIES

| | TEFLON 1 | TEFLON 2 | TEFLON 3 | TEFLON 4 | TEFLON 5 |
|---|---|---|---|---|---|
| MANUFACTURING DATA | | | | | |
| Crimp Factor | 7.2% | 8.16% | 8.16% | 8.16% | 8.16% |
| Warp Tension | 45 PLI | 23 PLI | 35 PLI | 34 PLI | 34 PLI |
| Over Stretch | 1.3% | 11.2% | 10% | 9.5% | 5.0% |
| Heat Set Temp. | 500° F. | 530° F. | 530° F. | 530° F. | 530° F. |
| Width Contraction | 19.2% | 9.9% | 10% | 15.3% | 16.7% |
| PHYSICAL DATA | | | | | |
| % Warp | 60 | 58 | 60 | 60 | 60% |
| Shute | 40 | 42 | 40 | 40 | 40 |
| Air Permeability | 625 CFM | 825 CFM | 625 CFM | 380 CFM | 380 CFM |
| Caliper | .070" | .068" | .072" | .076" | .076" |
| Weight | 5.51oz/ft$^2$ | 4.38oz/ft$^2$ | 4.69oz/ft$^2$ | 5.42oz/ft$^2$ | 5.47oz/ft$^2$ |
| Load a 1% Elong | 14.51 b. | 101 b. | 101 b. | 20.51 b | 201 b. |
| Seam Strength | 112 PLI | 66 PLI | 94 PLI | 160 PLI | 175 PLI |
| Operating Temp. | 550° F. | 550° F. | 550° F. | 550° F. | 550° F. |

What is claimed is:

1. A process for making a substantially nonstretchable belt used in the manufacture of matt material, which comprises:
   weaving poly (perfluoroolefin) monofilament at a load bearing filament content of about 15 to 200 and a non-load bearing filament content of about 15 to 200 filaments per inch with from 55 to 90% of the filaments being in the load bearing direction of the weave to produce a woven belt; and
   thermally fixing said belt by applying a force of 5 PLI to 30 PLI to the belt in the load bearing direction while heating said belt to a temperature substantially close to the white point for about 10 seconds to 30 min to produce a substantially thermally stable belt.

2. A process according to claim 1 further comprising finishing said belt by surfacing said belt surface to substantially remove surface irregularities.

3. A process according to claim 1 wherein the belt is thermally fixed by heating at a temperature of 500° to 600° F. for 10 seconds to 5 minutes while applying a force of 2 PLI to 500 to the load bearing filaments and applying little force to the non-load bearing filaments so as to produce controlled transfer of crimp from the load bearing filaments to the non-load bearing filaments.

4. A process according to claim 1 wherein about 2 to 25% crimp is transferred from the load bearing to the non-load bearing filaments during thermal fixation.

5. A process according to claim 1 wherein the weave pattern used is multilayered, crimp intensive, contains a predominant percentage of filaments in the load bearing direction, and each pair of adjacent non-load bearing filaments cooperate to prevent the corresponding load bearing filament around which they are woven, from being capable of adopting a straight configuration.

6. A process according to claim 1 wherein the weaving step is performed by applying a loom tension significantly lower than the filament yield point of the non-load bearing filaments.

7. A process according to claim 1 wherein the weaving produces from 10 to 200 load bearing filaments per inch and 10 to 200 non-load bearing filaments per inch.

8. A process according to claim 1 wherein the belt is produced is endless.

9. A substantially nonstretchable belt for manufacture of matt material, which comprises:
   a multilayer woven fabric of poly(perfluoroolefin) monofilament having about 15 to 200 load bearing filaments and 15 to 200 non-load bearing filaments per inch with from 55 to 90% of the filaments of the weave being load bearing filaments; a load bearing crimp of from 1% to 30%, the total load and non-load bearing crimp being from 5 to 35% and a regular pattern of load and non-load crimp knuckles; and wherein at least 80% of the non-load bearing crimp has been developed by crimp interchange from the load bearing crimp; at least 2 percent of the crimp knuckles have been been transferred from the load bearing to the non-load bearing filaments; the air permeability of the fabric is from 50 to 2000 cu. ft. per min. per sq. ft. of fabric at a pressure drop of 0.5 inches of water; and portions of the filaments at the knuckle junctions between the load and non-load filament directions are permanently shape deformed so as to adopt a sharply bent conformation and provide mechanical interlocking of the filaments.

10. A belt according to claim 9 wherein the filaments have been mechanically and thermally fixed to provide permanent shape deformation in the form of high frequency, high amplitude, sharp sinusoidal configurations.

11. A largely nonstretchable belt for use in the manufacture of matt materials, which comprises:
   a woven fabric of poly (perfluoro olefin) monofilament having a 15 to 200 load bearing filaments per inch, 15 to 200 non-load bearing filaments per inch; a crimp of 5-35%; an air permeability of 50 to 2000 cu. ft. per min. per sq. ft of fabric at a pressure drop of 0.5 inches of water, and which is produced by the process according to claim 1.

12. A belt made by the process according to claim 1.

13. A belt according to claim 9 which is endless.

14. A belt according to claim 11 which is endless.